(12) United States Patent
Schlegel et al.

(10) Patent No.: US 6,349,959 B2
(45) Date of Patent: *Feb. 26, 2002

(54) WARNING DEVICE AND METHOD

(75) Inventors: Daniel K. Schlegel, Salem; Richard A. Hardesty, Franksville, both of WI (US)

(73) Assignee: Case Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,359

(22) Filed: May 7, 1999

(51) Int. Cl.⁷ ................................................. B60D 1/36
(52) U.S. Cl. ........................ 280/477; 70/232; 70/258; 116/284
(58) Field of Search ................................ 172/430, 439, 172/440, 275; 70/14.58, 232, 258; 116/284, 303, 305; 280/477, 504

(56) References Cited

U.S. PATENT DOCUMENTS

| | | | | |
|---|---|---|---|---|
| 1,216,899 A | | 2/1917 | Weyer | 116/28 R |
| 1,448,610 A | | 3/1923 | Weinberger | 40/460 |
| 2,455,208 A | | 11/1948 | Wirth | 40/460 |
| 3,572,759 A | * | 3/1971 | Baugh | 280/461 |
| 3,807,769 A | * | 4/1974 | Thompson et al. | 280/479 R |
| 3,855,959 A | * | 12/1974 | Hinze | 116/124 R |
| 3,896,759 A | * | 7/1975 | Ogura | 116/124 R |
| 3,924,558 A | * | 12/1975 | Di Grazia | 116/28 R |
| 4,019,753 A | * | 4/1977 | Kestel | 280/415 A |
| 4,118,608 A | * | 10/1978 | Kussy et al. | 200/56 R |
| 4,283,722 A | * | 8/1981 | Kito et al. | 340/685 |
| 4,415,175 A | * | 11/1983 | Kainer | 280/460 A |
| 4,549,744 A | * | 10/1985 | Herr et al. | 280/415 |
| 4,877,274 A | * | 10/1989 | Poe | 292/113 |
| 5,011,200 A | * | 4/1991 | Glancy et al. | 292/113 |
| 5,058,523 A | | 10/1991 | Mikkonen et al. | |
| 5,169,279 A | * | 12/1992 | Zimmerman | 414/703 |
| 5,547,242 A | * | 8/1996 | Dukatz et al. | 290/65.1 |
| 5,626,093 A | * | 5/1997 | Jacobs et al. | 116/28.1 |
| 5,641,174 A | * | 6/1997 | Terry et al. | 280/434 |
| 5,662,359 A | * | 9/1997 | Kargula | 285/93 |
| 5,664,839 A | * | 9/1997 | Pedronno et al. | 297/378.13 |
| 5,692,855 A | * | 12/1997 | Burton | 403/325 |
| 5,727,342 A | * | 3/1998 | Horton | 37/468 |

* cited by examiner

*Primary Examiner*—Brian L. Johnson
*Assistant Examiner*—Daniel Yeagley
(74) *Attorney, Agent, or Firm*—Foley & Lardner

(57) ABSTRACT

A work vehicle including a hitch assembly having a mechanism mounted thereon, with a warning device connected to the mechanism. The warning device comprises a status indicator operatively associated with the mechanism indicates the status of the mechanism by being displayed when the mechanism is in a first condition and not displayed when the mechanism is in a second condition. The warning device of the present invention displays the status indicator when the mechanism is in the unlocked condition and in an offset position. The status indicator of the present invention is not displayed when the mechanism is in the locked condition. As such, the present invention provides a method to actively warn the operator of the work vehicle of the status of the hitch without the operator having to inspect the hitch or dismounting from the cab of the work vehicle.

15 Claims, 5 Drawing Sheets

WARNING DEVICE AND METHOD

FIELD OF THE INVENTION

This invention is related generally to warning devices and more particularly to an active warning device for an implement hitch coupler.

BACKGROUND OF THE INVENTION

Three-point hitches are used at the rear and at the front of work vehicles to lift, carry, push and pull various implements. Three-point hitches typically include a rockshaft, lift links, draft links, an upper or center link and rocker shift actuators. The rockshaft is pivotally supported by the work vehicle and includes arms pivotally connected to the lift links. The lift links extend from the arms of the rockshaft and are pivotally connected to the draft links. The draft links are themselves pivotally connected to the work vehicle. The actuators are pivotally coupled at one end to the work vehicle and at an opposite end to the rockshaft to pivotally raise and lower the rockshaft. Because the arms of the rockshaft are coupled to the lift links and thereby to the draft links, such pivotal raising and lowering of the rocker arms correspondingly pivotally raises and lowers the draft links to thereby lift and lower implements mounted on the draft links.

To attach the three-point hitch to a three-point hitch implement, it is necessary that the draft links are aligned with corresponding attachment points or pins on the implement. However, the attachment points on the three-point hitch implement are frequently out of alignment due to the implement being parked on uneven ground or on soft ground which allows the implement to repose into an unlevel, misaligned condition. As a result, the operator must realign the draft links with the attachment points of the implement. A three-point hitch quick coupler facilitates the alignment and attachment of the implement to the three-point hitch. The implement is then coupled to the three-point hitch with a three-point hitch quick coupler and locked in place by a latching mechanism.

An operator of the work vehicle must be sure that the implement is properly secured to the hitch, especially if the operator is not the person attaching the implement to the work vehicle. The implement is properly secured to the hitch when each draft link latch is in a locked condition. For example, the implement is not properly secured to the hitch when the draft link latch is in an unlocked condition or when the implement is hung up on the draft link in a position offset from the locked and unlocked condition. Previous warning methods use a warning decal that instructs the operator to inspect the draft link latches to ensure the implement is secure. Since the draft link latch is typically not visible from the work vehicle cab, the operator must dismount the work vehicle to inspect the latches securing the implement.

Thus, there is a continuing need for an active warning device that will display the status of each draft link latch. Further, there is a need for a warning device which indicates when the implement is properly secured to the hitch. Further still, there is a need for a warning device which indicates when the implement is properly secured to the hitch without the operator having to dismount from the work vehicle. The warning device should display the status of the draft link latch for all three conditions (locked, unlocked or offset between locked and unlocked) as described above.

SUMMARY OF THE INVENTION

The present invention provides a work vehicle including a hitch assembly having a mechanism mounted thereon, with a warning device connected to the mechanism. The warning device comprises a status indicator operatively associated with the mechanism which indicates the status of the mechanism by being displayed when the mechanism is in a first condition and not displayed when the mechanism is in a second condition.

The present invention also provides a warning device comprising a status indicator positioned to align within a window in a rotatable lever which lever can be rotated between a first position and a second position and can be in a position offset from the first and second positions. The status indicator is displayed in the window when the lever is in the first position, it is not displayed in the window when the lever is in the second position and the status indicator is displayed but not in the window when the lever is in a position offset from the first and second positions. The warning device can be connected to a mechanism with a status indicator of a warning device operatively associated with the mechanism that indicates the status of the mechanism. The status indicator is displayed when the mechanism is in a first condition and the status indicator is not displayed when the mechanism is in a second condition.

The warning device of the present invention displays the status indicator when the mechanism is in the unlocked condition or the offset position. The status indicator of the present invention is not displayed when the mechanism is in the locked condition. As such, the present invention provides a method for notifying an operator of the status of a locking lever (the draft link latch) or a mechanism by covering a means for indicating the status of the latch when the latch is locked and exposing the means for indicating the status of the latch when the latch is unlocked. This method actively warns the operator of the work vehicle of the status of the hitch without the operator having to inspect the hitch or dismounting from the cab of the work vehicle.

Other features and advantages of the present invention will become readily apparent in the following detailed description, appended drawings and accompanying claims.

Figure 1:
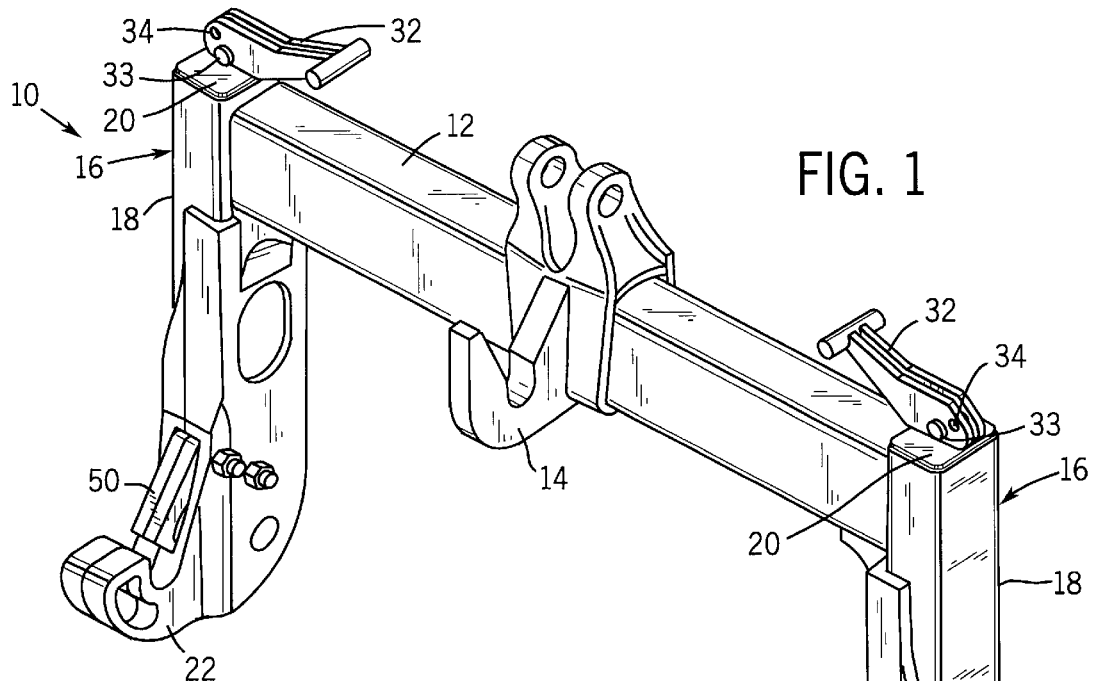
FIG. 1 is a perspective view of a three-point hitch quick coupler.

Before explaining the preferred embodiment of the invention in detail, it is to be understood that the invention is not limited in the application to the details of construction and the arrangement of components set forth in the following description or as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

Referring to FIGS. 1, 2, 3 and 5, there is illustrated a three-point hitch quick coupler 10 as mounted on a hitch assembly 8 attached to a work vehicle 5 for coupling an implement (not shown) for use with the work vehicle 5. The hitch assembly is more fully described in U.S. Pat. No. 5,601,146, assigned to this Applicant's assignee. The three-point hitch quick coupler 10 generally comprises a horizontal member 12 having a vertical member 16 mounted on each of the horizontal member 12. Vertical members 16 can each include a tube 18 which is attached to one end of the horizontal member 12. A lower hook 22 is mounted on each tube 18. Approximately midway between the two vertical members 16 and mounted on the horizontal member 12 is an upper hook 14. The upper hook 14 and the two lower hooks 22 comprise a typical three-point hitch quick coupler 10. The two lower hooks 22 and the upper hook 14 engage the attachment points or pins of an implement to be pushed, pulled or lifted by the work vehicle. Generally, the two lower hooks 22 are provided with a mechanism 46 for latching or locking the implement to the lower hooks 22.

Figure 3:
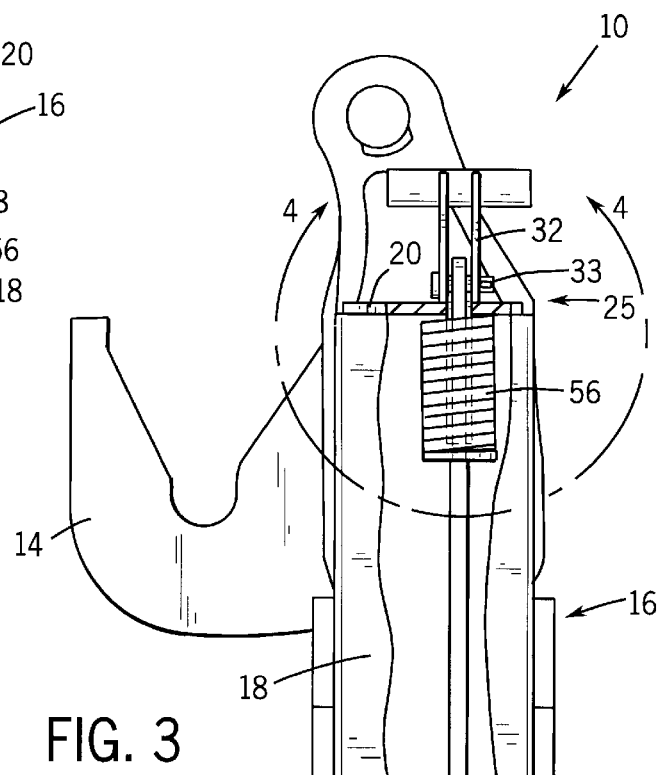
FIG. 3 is a partial cut away side elevation view of the three-point hitch quick coupler shown in FIG. 1 exposing a mechanism for latching an implement to the three-point hitch.
Figure 3:
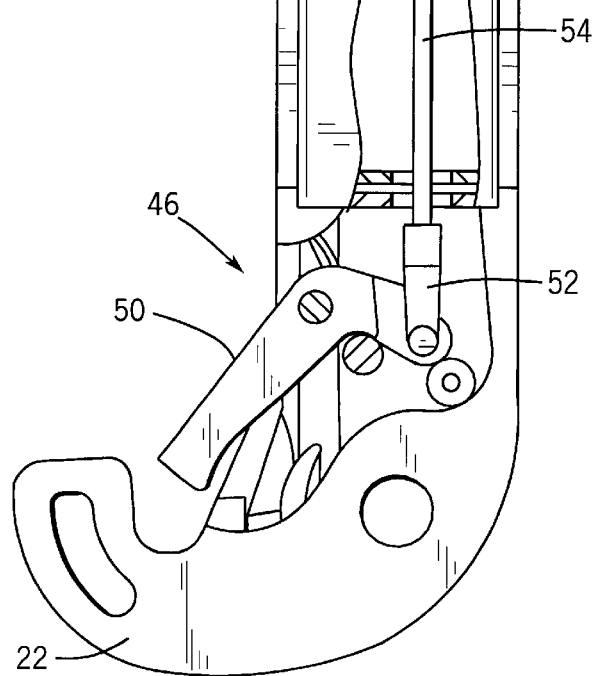
Figure 5:
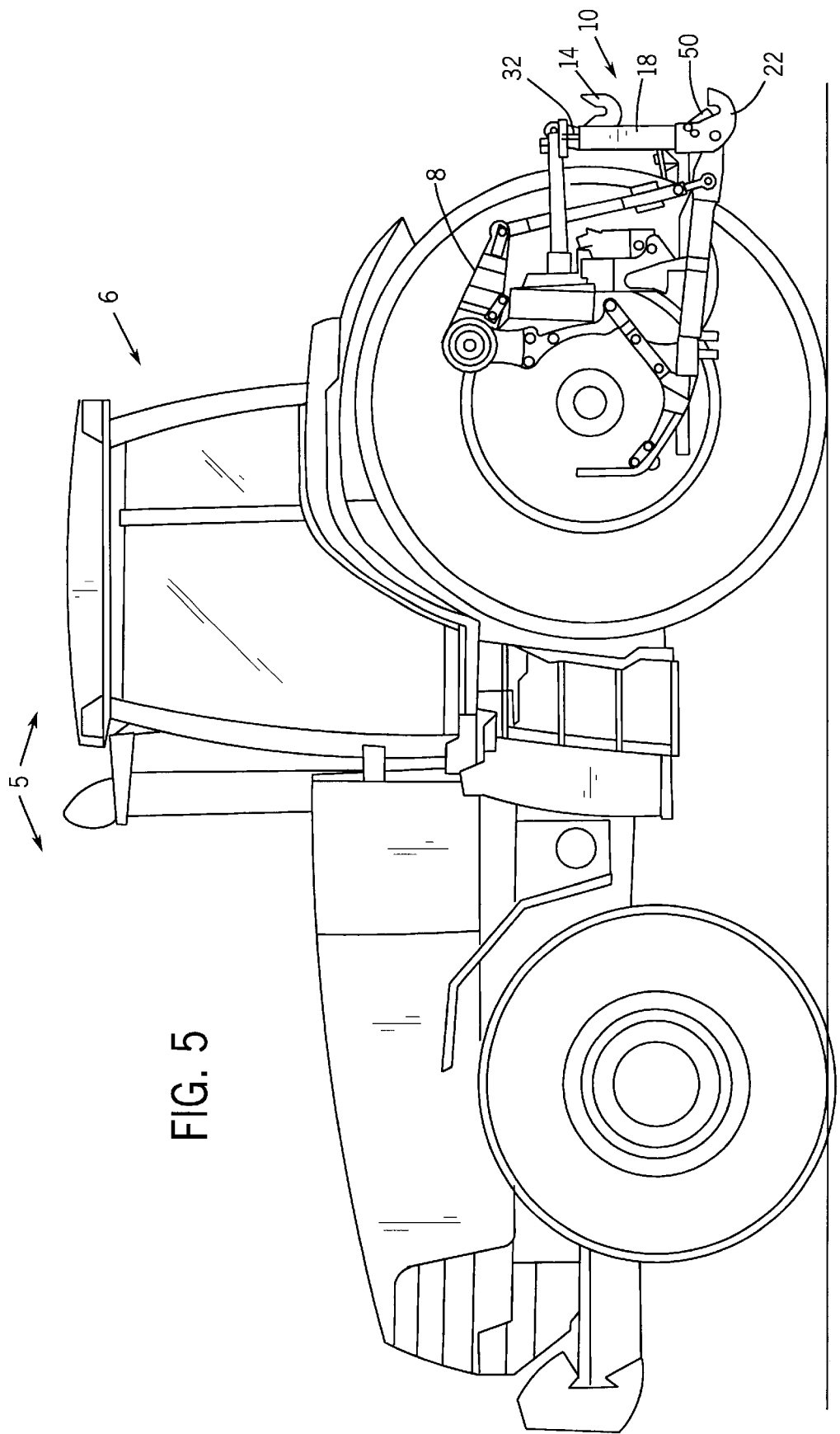
FIG. 5 is an illustration of a work vehicle having a three-point hitch assembly mounted at the rear of the vehicle and a three-point hitch quick coupler mounted on the hitch assembly.

FIG. 3 provides a partial cut away side elevation view of the three-point hitch quick coupler 10. The three-point hitch quick coupler 10 having a mechanism 46 for latching or locking the implement to the draft link 22 comprises a latch 50 pivotally mounted in the vertical member 16. A clevis 52 is attached to the latch 50. A link 54 is attached to the clevis 52 and extends through the tube 18 and is operatively connected to a handle 32 at the tube cover plate 20. The handle 32 is rotatably attached to a pivot pin 33. A means for biasing the mechanism 46, such as a spring 56, is provided.

Figure 2:
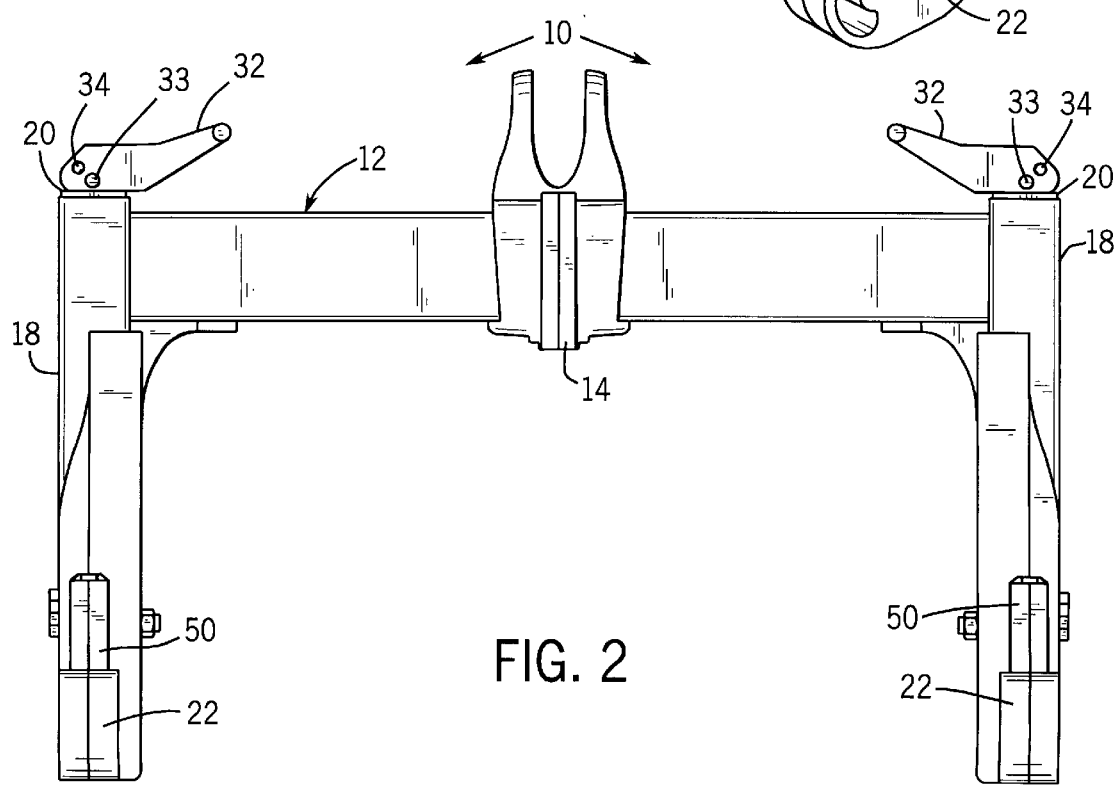
FIG. 2 is a rear elevation view of the three-point hitch quick coupler shown in FIG. 1.

The handle 32, a side view of which is shown in FIG. 2, is provided with an aperture, such as a window 34. The handle (as shown in FIG. 2) is in the locked condition. The handle 32 is a rotatable lever that selectively rotates about the pivot pin 33 from the locked condition to an unlocked condition and back again. The link 54 is pulled up which pulls the clevis 52 which in turns rotates latch 50 into the lower hook 22, thereby allowing the implement attachment point or pin to engage or disengage the lower hook 22. When the handle 32 is moved in the opposite direction, the link 54 is pushed down, which pushes the clevis 52, which in turn rotates the latch 50 into a locked position and secures the implement attachment point or pin to the hitch.

Figure 6B:
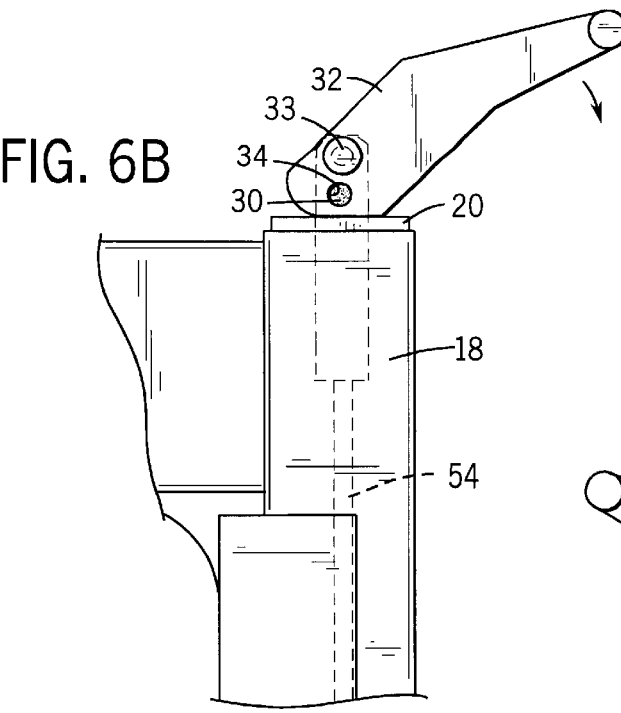
FIG. 6B is a partial side elevation view of the three-point hitch quick coupler illustrating the status indicator of the present invention exposed in the window when the handle is in an unlocked position as shown in FIG. 6A.
Figure 7B:
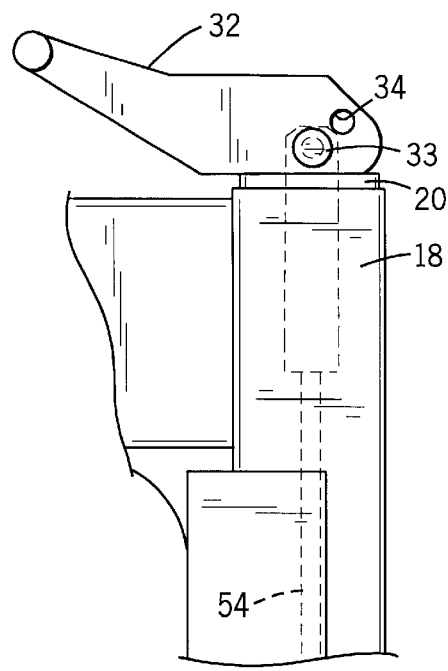
FIG. 7B is a partial side elevation view of the three-point hitch quick coupler illustrating the status indicator of the present invention is not exposed when the handle is in a locked position as shown in FIG. 7A.
Figure 6A:
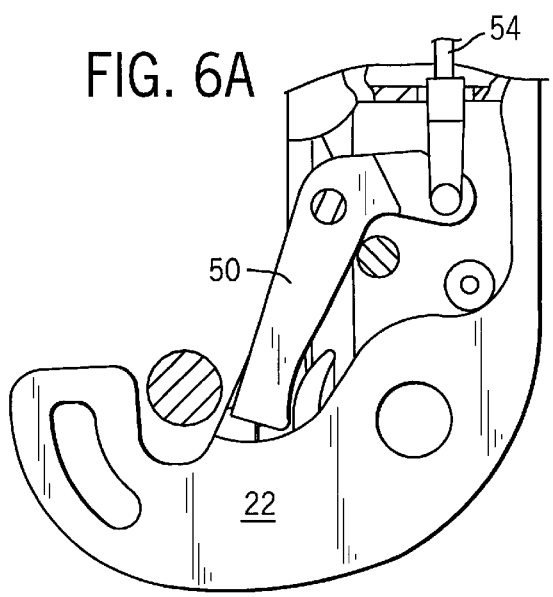
FIG. 6A is a partial cut away side elevation view of the three-point hitch quick coupler illustrating the unlatched position of the latch with an implement pin entering the lower hook.
Figure 7A:
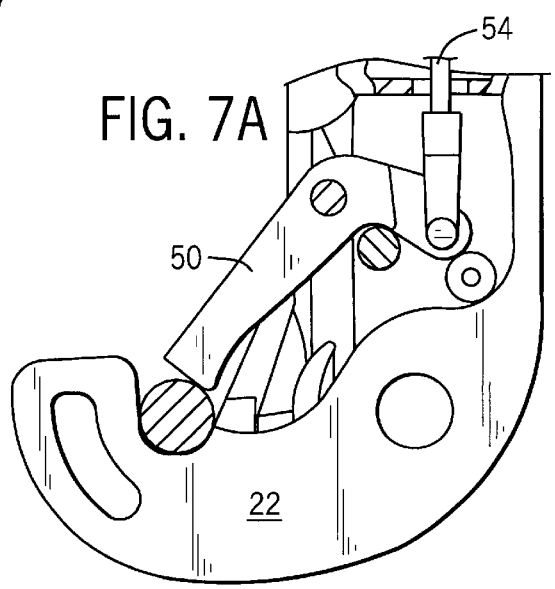
FIG. 7A is a partial cut away side elevation view of the three-point hitch quick coupler illustrating the latched position of the latch with an implement pin seated in the lower hook and the latch locked in place.
Figure 8B:
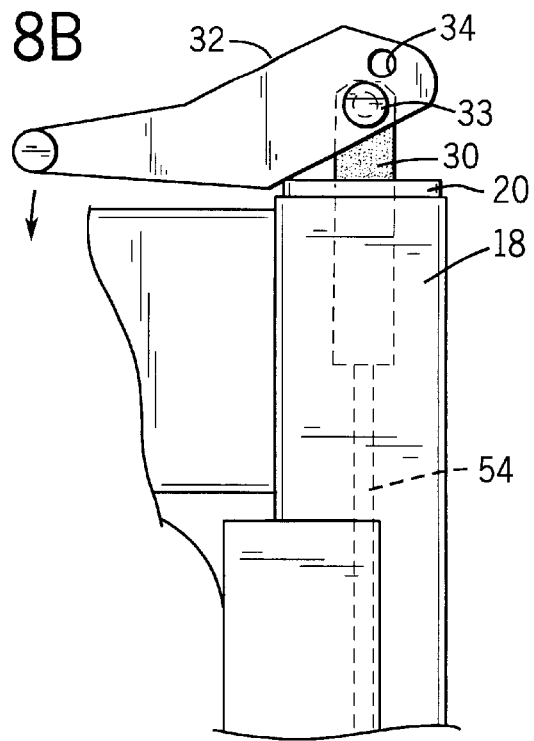
FIG. 8B is a partial side elevation view of the three-point hitch quick coupler illustrating the status indicator of the present invention is exposed when the handle is in an offset position which is different than the first and second positions of the handle as illustrated in FIGS. 6B and 7B caused by the implement pin not being seated properly and pushing against the latch thereby pushing the handle above the tube cover plate.
Figure 8A:
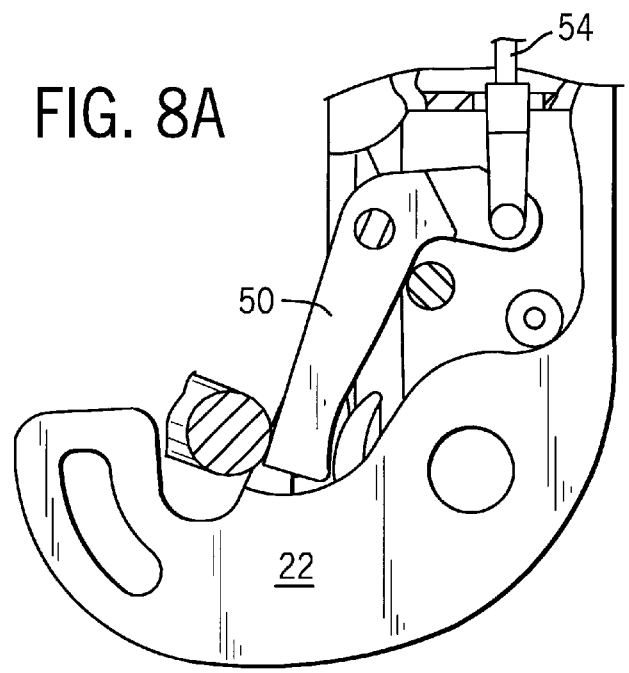
FIG. 8A is a partial cut away side elevation view of the three-point hitch quick coupler illustrating the unseated and unlatched position of the latch caused by the misalignment of the implement in the lower hook.

A warning device 25 comprises a status indicator 30 mounted on the rotatably lever 32 (handle) and positioned to align within the window 34 in the lever 32 when the lever is in a first position, see FIGS. 6A and 6B, and to align out of the window when the lever is in the second position, see FIGS. 7A and 7B. For purposes of this disclosure, the first position is the unlocked condition and the second position of the handle 32 is the locked condition. A third condition or, situation arises when the implement attachment point or pin engages the lower hook 22 and pushes against the latch 50 thereby pushing the clevis 52 and link 54 respectively up inside the vertical member 16 which in turn lifts the handle 32 above the tube cover plate 20, see FIGS. 8A and 8B. Such action displays the status indicator 30 between the handle 32 and the tube cover plate 20 regardless of the orientation of the handle 32. The display of the status indicator 30, other than in the window 34, is indicative that the latch 50 is also in an unlocked condition.

The status indicator 30 is colored different than a color of the surface of which the status indicator is positioned. For instance, the status indicator 30 could be yellow and the handle 32, which has the window 34 through which the status indicator is displayed, is black. It should be understood that although any color can be used for the status indicator 30, for purposes of visibility, it should be a color that is markedly different than the mechanism 46 or the surrounding surfaces which are viewed with the status indicator 30. The preferred embodiment depicted in the FIGURES is a colored member 38 mounted on either side of the link 54 and can be displayed in each window 34 of the two member handle 32 of the mechanism for locking 46. The colored member is preferably plastic in material and through-colored. As the colored member 38 wears its color is maintained, it is inexpensive to manufacture and is easily serviced. Alternatives to the colored member 38 status indicator 30 is a painted surface area or a decal or an electric light. The painted surface area can be a portion of the link 54 painted a color that is different than the color of the handle 32 which has the window 34 through which the link is viewed in the unlocked position. A decal can also be used as the status indicator 30 and applied to the link at a location that will allow the decal to be aligned within the window 34 in the handle 32 when the handle 32 is in the first position and aligned out of the window 34 when the handle 32 is in the second position. An alternative embodiment of the status indicator 30 can be an electric light. The electric light can be mounted on the cross member 12 of the three-point hitch 10 or could be mounted inside the cab 6 or other convenient location of the work vehicle 5. A conventional microswitch, reed switch, or other actuator switch can be mounted at a convenient location on the vertical member and in mechanical or magnetic communication with the mechanism for locking 46 so that the light is energized when the handle is in the first position and not energized when the handle is in the second position. The light can be powered by any convenient and conventional means, such as a battery or a circuit connected to work vehicle 5 or to an implement attached to the work vehicle.

It should be understood that for purposes of this disclosure the first position or first condition has been deemed the unlocked condition and the second position or second condition has been deemed the locked condition. However, the reverse can also be established without diminishing the effect of the warning device of the present invention.

Figure 4:
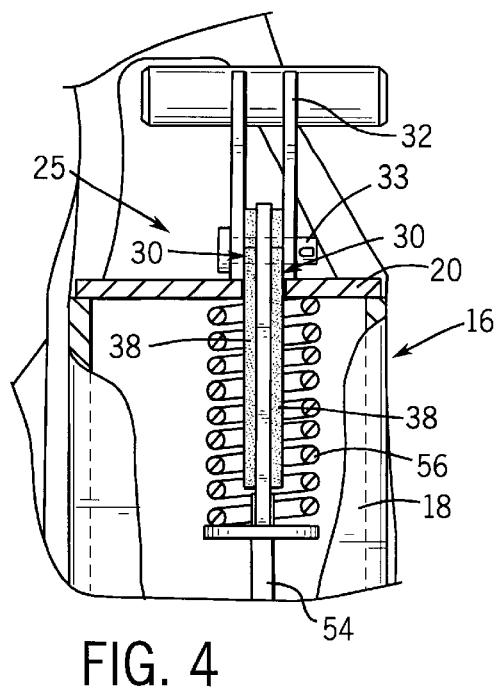
FIG. 4 is a detail of the warning device of the present invention connected to a part of the mechanism for latching, with the mechanism in a locked condition.

In operation, the present invention provides a method for notifying an operator of the work vehicle and implement combination of the status of a locking lever 32 by exposing a means for indicating that the locking lever 32 is unlocked and covering said means for indicating that the locking lever 32 is locked. The means for indicating is the status indicator 30 which, as described above, can be a colored member 38, a painted surface area, an electric light and a decal. FIG. 4 illustrates the status indicator 30 being the colored member 38 which extends from the lever 32 down along side the link 54 inside the spring 56 of the mechanism for locking 46. It should be understood that depicted in the illustrations and described herein is a three-point hitch having two mechanisms for locking which employ the warning device 25 of the present invention. An implement hitch using only one warning device 25 or more than two warning devices 25 are contemplated and deemed to be within the scope of this disclosure.

Thus, it should be apparent that it has been provided in accordance with the present invention a warning device and method in which a status indicator operatively associated with a mechanism for locking indicates the status of such mechanism by displaying the status indicator when the mechanism is in a first or unlocked condition and not displaying the status indicator when the mechanism is in a second or locked condition has been disclosed. Although the invention has been described in conjunction with specific embodiments thereof, it is evident that many alternatives, modifications and variations will be apparent to those ordinarily skilled in the art. Accordingly, it is intended to embrace all such alternatives, modifications and variations that fall within the spirit and scope of the appended claims.

What is claimed is:

1. A warning device for a latching mechanism, comprising:
    a rotatable lever having a window and pivotally attached to a reciprocable link and a rotatable latch, with the lever rotatable about the pivotally attached link between a first unlocked latch position and a second locked latch position; and
    a status indicator mounted on the rotatable lever and positioned to align within the window in the lever when the latch is in the first position and to align oui of the window when the latch is in the second position and wherein the status indicator is also positioned to be exposed other than in the window when the latch has an unlocked position offset from the first and second positions.

2. The warning device of claim 1, wherein the status indicator is a colored member.

3. The warning device of claim 1, wherein the status indicator is colored a color different than a color of a surface on which the status indicator is positioned.

4. The warning device of claim 1 wherein the status indicator is a painted surface area.

5. The warning device of claim 1 wherein the status indicator is a decal.

6. The warning device of claim 1 wherein the status indicator is displayed regardless of the orientation of the rotatable lever when the latching mechanism in the unlocked offset position.

7. A work vehicle with a hitch assembly including a quick coupler having a latching mechanism mounted thereon, with a warning device connected to the latching mechanism, the warning device comprising:
    a rotatable handle having a window and pivotally attached to a reciprocable link and rotatable latch,with the handle rotatable about the pivotally attached link between a first unlocked latch condition and a second locked latch condition; and
    a status indicator mounted on the rotatable handle and positioned to align within the window in the handle when the latch is in the first condition and to align out of the window when the latch is in the second condition and wherein the status indicator is also positioned to be exposed other than in the window when the latch is in an unlocked third condition.

8. The work vehicle of claim 7, wherein the third condition of the latching mechanism is when the latch is offset from the first unlocked and second locked conditions.

9. The work vehicle of claim 7, wherein the quick coupler is a three-point hitch.

10. The work vehicle of claim 7 wherein the status indicator is a colored member.

11. The work vehicle of claim 7, wherein the status indicator is colored a color different than a color of the mechanism.

12. The work vehicle of claim 7, wherein the status indicator is displayed regardless of the orientation of the rotatable handle coupled to the latching mechanism when the latch is in the unlocked third condition.

13. The work vehicle of claim 7 wherein the status indicator is a painted surface area.

14. The work vehicle of claim 7 wherein the status indicator is a decal.

15. A method for indicating the locked and unlocked status of a latching mechanism to an operator of a work vehicle, the method comprising:
    (1) providing a rotatable lever having a window and a pivotally attached reciprocable link and rotatable latch, with the lever rotatable about the pivotally attached link between a first unlocked latch position, a second locked latch position and a third unlocked latch position offset from the first unlocked and second locked positions;
    (2) rotating the lever to one of the first unlocked position, the second locked position and the third unlocked position; and
    (3) providing a status indicator mounted on the rotatable lever and aligning the status indicator so that the status indicator is:
        (a) within the window in the rotatable lever when the latch is in the first unlocked position;
        (b) out of the window when the latch is in the second locked position; and
        (c) exposed other than in the window when the latch is in the third unlocked position.

* * * * *